United States Patent [19]

Kondo et al.

[11] 4,208,490

[45] Jun. 17, 1980

[54] PROCESS FOR PREPARING POLYMER RESINS

[75] Inventors: Masatsune Kondo; Akira Tanoue, both of Niihama, Japan

[73] Assignee: Sumitomo Chemical Company, Limited, Osaka, Japan

[21] Appl. No.: 845,041

[22] Filed: Oct. 25, 1977

Related U.S. Application Data

[63] Continuation of Ser. No. 709,373, Jul. 28, 1976, abandoned.

[30] Foreign Application Priority Data

Jul. 31, 1975 [JP] Japan .................................. 50-94053

[51] Int. Cl.$^2$ ............................................ C08F 279/02
[52] U.S. Cl. .................................... 525/243; 525/252; 525/253; 525/255
[58] Field of Search ............... 260/878 R, 879, 880 R, 260/881, 884, 885; 525/243

[56] References Cited

U.S. PATENT DOCUMENTS

| | | | |
|---|---|---|---|
| 3,436,440 | 4/1969 | Abe | 260/880 R |
| 3,657,172 | 4/1972 | Gallagher | 260/881 |
| 3,663,655 | 5/1972 | Sturt | 260/884 |
| 3,663,657 | 5/1972 | Sturt | 260/884 |
| 3,862,913 | 1/1975 | Sturt | 260/880 R |
| 4,011,283 | 3/1977 | Sturt | 260/878 R |

*Primary Examiner*—Paul R. Michl
*Attorney, Agent, or Firm*—Birch, Stewart, Kolasch and Birch

[57] ABSTRACT

A process for preparing polymer resins by polymerization of at least one ethylenic monomer onto at least one rubbery polymer optionally grafted with at least one ethylenic monomer which comprises initiating the polymerization in an emulsion system, adding a suspension stabilizer to the polymerization system at the stage after the conversion of the ethylenic monomer to be polymerized reaches 5% by weight and before the emulsion system is broken and then continuing the polymerization in a suspension system until completion of the polymerization. By the process, polymer resins can be produced in particles having a beautiful appearance and an even particle size with a narrow range of particle size distribution.

10 Claims, No Drawings

PROCESS FOR PREPARING POLYMER RESINS

This application is a continuation of copending application Ser. No. 709,373, filed on July 28, 1976, now abandoned.

The present invention relates to a process for preparing polymer resins. More particularly, it relates to an improved process for preparing polymer resins by polymerizing at least one ethylenic monomer onto at least one rubbery polymer optionally grafted with at least one ethylenic monomer.

For production of thermoplastic polymer resins such as ABS resins (i.e. resins produced from acrylonitrile, butadiene and styrene as the essential monomer components) and impact resistance polystyrene resins, there is known a process which comprises polymerizing at least one ethylenic monomer onto at least one rubbery polymer optionally grafted with at least one ethylenic monomer initially in an emulsion system and later in a suspension system without breaking the emulsion state by adding a coagulating agent to the polymerization system before the initiation of the polymerization.

In emulsion polymerization of ethylenic monomers onto rubbery polymers using a polymerization initiator, the mixation of the monomer component with the rubber component in a latex results in the solubilization of the latex micelles to a certain extent by taking the monomer component therein. However, most of the monomer component forms fine oily droplets, which are dispersed in an aqueous medium in an emulsion state. The radicals originated from the polymerization initiator initiate the polymerization in the micelles. While the monomer component in such micelles is polymerized to make polymers, the micelles are supplied with the monomer component from other micelles or droplets with a diffusion, whereby the micelles are filled up with the produced polymers. Since, however, an excessive amount of the monomer component is present as oily droplets, the emulsifier protecting the surfaces of the droplets can not maintain such action, and the emulsion state is broken. If a suspension stabilizer is present in the polymerization system at this stage, then the emulsion state will be transferred to a suspension state, and the polymerization will be perfected in the resulting suspension system.

Based on the above consideration, there have been proposed some procedures for carrying out the polymerization of at least one ethylenic monomer onto at least one rubbery polymer, among which typical ones are as follows: (1) a procedure wherein the polymerization is carried out by the use of a certain specific polymerization initiator and the addition of a suspension stabilizer to the polymerization system is made prior to the initiation of polymerization and further when the emulsion state is broken [Japanese Patent Publication No. 21073/1968]; (2) a procedure wherein the polymerization is carried out by the use of another certain specific polymerization initiator and the addition of a suspension stabilizer to the polymerization system is made prior to the initiation of polymerization or when the emulsion state is broken [Japanese Patent Publication (unexamined) No. 56780/1973].

While it is possible to perfect the polymerization initially in the emulsion system and later in the suspension system by the said conventional procedures, much deposit of the produced polymer onto the wall of the reaction apparatus wherein the polymerization was carried out occurs and the particles of the produced polymer has a wide particle size distribution. Further, fine particles of irregular form are much produced in the procedure (1). In the procedure (2), the addition prior to the initiation of polymerization affords the same results as in the procedure (1), and that at the breaking of the emulsion state results in the production of coarse particles in large proportions.

As the result of the extensive study overcoming the said drawbacks as seen in the conventional procedures, it has now been found that the addition of a suspension stabilizer to the polymerization system at a certain specific stage in the course of polymerization can afford the polymer resin in particles of even size and beautiful appearance without material production of fine and coarse particles and without substantial deposit of the polymer onto the wall of the reaction apparatus. The present invention is based on this finding.

According to the present invention, there is provided a process for preparing polymer resins by polymerization of at least one ethylenic monomer onto at least one rubbery polymer optionally grafted with at least one ethylenic monomer which comprises initiating the polymerization in an emulsion system, adding a suspension stabilizer to the polymerization system at the stage after the conversion of the ethylenic monomer to be polymerized reaches 5% by weight and before the emulsion system is broken and then continuing the polymerization in a suspension system until completion of the polymerization.

As understood from the foregoing descriptions, the most characteristic feature of this invention is to add a suspension stabilizer to the polymerization system at a certain specific stage, i.e. a period after the conversion of the monomer component reaches 5% by weight and before the emulsion state is broken. The addition may be effected all at once or in portions. When the addition is made prior to the said period, there may be unfavorably produced polymer particles having a wide particle size distribution and including those of abnormal or irregular forms in a considerable amount. When the addition is made at or after the breaking of the emulsion state, the produced polymer particles become undesirably coarser and sometimes form aggregative blocks. Still, the time at which the breaking of the emulsion state occurs is associated with the conditions in the polymerization, the emulsion stability of the latex used, etc.

As the suspension stabilizer, there may be used any conventional one such as fine powders of inorganic compounds hardly soluble in water (e.g. magnesium carbonate, calcium tertiary phosphate) or natural or synthetic water-soluble high polymeric materials (e.g. starch, gelatin, partially saponified polyvinyl alcohol, polyviylpyrrolidone, methyl cellulose, hydroxyethyl cellulose, hydroxypropyl methyl cellulose). These suspension stabilizers may be used alone or in combination. The amount of the suspension stabilizer may be usually from 0.02 to 1.0 part by weight to 100 parts by weight of water used in the polymerization system.

The rubber component to be used in the process of this invention may be a rubbery polymer optionally grafted with at least one ethyleric monomer. Such rubbery polymer is employed in the form of a latex. As the non-grafted rubbery polymer, there may be used natural or synthetic rubbery polymers such as natural rubber, butadiene rubber, styrene-butadiene copolymer, acrylonitrile-butadiene copolymer, isoprene rubber, chloroprene rubber, acrylic rubber, ethylene-propylene-diene terpolymer and ethylene-vinyl acetate copolymer. These polymers may be cross-linked or not. The grafted rubbery polymer may be the one obtained by graft polymerizing one or more ethylenic monomers onto any of the said natural or synthetic rubbery polymers. These rubbery polymers may be used alone or in combination.

As the monomer component to be polymerized onto the rubber component, there may be used vinyl monomers, vinylidene monomers, vinylene monomers, etc. More specifically, the following monomers are exemplified: styrenic monomers (e.g. styrene, α-methylstyrene, o-ethylstyrene, o-chlorostyrene, p-chlorostyrene, divinylbenzene), acrylonitrile and its related compounds (e.g. acrylonitrile, α-chloroacrylonitrile, vinylidene cyanide), acrylic acid and its esters (e.g. acrylic acid, methyl acrylate, ethyl acrylate), methacrylic acid and its esters (e.g. methacrylic acid, methyl methacrylate, ethyl methacrylate, glycidyl methacrylate), vinyl esters (e.g. vinyl acetate), vinyl and vinylidene halides (e.g. vinyl chloride, vinylidene chloride), vinylketone, acrylamide, vinylpyrrolidone, maleic anhydride, maleimide, etc. These monomers may be employed alone or in combination.

The said ethylenic monomers may be also used as the monomer component to be grafted on the natural or synthetic rubbery polymers as above mentioned for preparation of the grafted rubbery polymer.

As to the proportion of the rubbery component and the monomer component, there is no particular limitation. In general, however, it is preferred to adopt such proportion as to make a rubber content of 3 to 60% by weight in the ultimately produced polymer resin.

For polymerization of the monomer component onto the rubber component, there may be employed conventional polymerization initiators and chain transfer agents.

As the polymerization initiator, there may be used various conventional radical initiators, for instance, organic radical initiators such as azo compounds (e.g. 2,2'-azobisisobutyronitrile, 2,2'-azobisisovaleronitrile, 2,2'-azobis(2,4-dimethylvaleronitrile)) and organic peroxides (e.g. diisopropyl peroxydicarbonate, dilauroyl peroxide, di(3,5,5-trimethylhexanoyl) peroxide, dibenzoyl peroxide, t-butyl peroxy-2-ethylhexanoate, t-butyl peroxybenzoate, t-butyl peroxylaurate, dicumyl peroxide, t-butyl cumyl peroxide, t-butyl peroxide). They may be used alone or in combination.

As the chain transfer agent, there may be employed any material having a chain transference ability. For instance, alkyl halides, alkyl sulfides, alkyl disulfides, 1,4,5,8-tetrahydronaphthalene, terpinolene, thioglycolic esters, α-methylstyrene dimer and the like are usable. Among them, the use of alkylmercaptans is especially preferred. The addition of the chain transfer agent to the polymerization system is usually effected all at once or portionwise prior to or in the course of polymerization.

While there is no particular limitation on the amount of water in the polymerization system, it is generally favored to use water in an amount affording a weight ratio of 1:1 –5 in the proportion of the combined amount of the rubber component and the monomer component and the amount of water at the stage of the transfernce from the emulsion system to the suspension system. In most cases, it is desirable to increase the amount of water with the increase of the rubber component.

Any particular consideration is not necessary on the order to be charged of the said materials other than the suspension stabilizer into the reaction apparatus. Usually, however, it is preferred first to charge a latex of the rubber component into the reaction apparatus containing a desired amount of an aqueous medium while stirring and then to add the remaining materials except the suspension stabilizer thereto.

The polymerization temperature may be appropriately set in association with the decomposition temperature of the polymerization initiator, and it is usually between 50° and 140° C.

Recovery of the produced polymer resin from the reaction mixture may be accomplished by a coventional procedure. For instance, the reaction mixture is filtered to collect particles of the polymer resin, which are then dehydrated and dried.

When desired, conventional additives such as lubricants, plasticizers, oxidation stabilizers, coloring agents and foaming agents may be incorporated into the polymer resin. Alternatively, these additives may be incorporated into the polymerization system prior to or in the course of polymerization.

The polymer resin produced by the process of this invention has excellent physical properties such as high impact resistance. In addition, it is advantageous that the polymer resin is obtainable in the form of particles of even shape and size with beautiful appearance.

Practical and presently preferred embodiments of the present invention are illustratively shown in the following Examples wherein % is by weight.

EXAMPLE 1

Into a glass-lined autoclave of 5 liter volume equipped with a turbine type agitating blade and provided with a baffle plate on the wall, water (2000 ml) was charged, and ABS latex (pH, 11.1; ABS content, 40%; ABS composition, 50% of polybutadiene, 15% of acrylonitrile and 35% of styrene with a grating yield of 50%; average particle size of graft rubber, 0.3μ) (250 g) was added thereto in 5 minutes while stirring at 600 r.p.m. Then, acrylonitrile (300 g) and styrene (700 g) were charged in the autoclave in 2 minutes, and a solution of dilauroyl peroxide (6.0 g) as a polymerization initiator, tris-nonylphenyl phosphite (5.0 g) as an oxidation stabilizer and t-dodecylmercaptan (6.0 g) as a chain transfer agent in styrene (50 g) were adeed thereto. After replacement of the air in the autoclave by nitrogen gas, polymerization was initiated by elevation of the temperature to 70° C. and continued at this temperature for a total period of 5 hours, during which a solution of a 7:3 (by weight) mixture of partially saponified polyvinyl alcohol ("Gosenol GH-200" manufactured by Nippon Synthetic Chemial Industry Co., Ltd.) and hydroxypropyl methyl cellulose ("Metrose 90 SH-100" manufactured by Shin-Etsu Chemical Industry Co., Ltd.) (2 g) as a suspension stabilizer in water (100 ml) was added to the polymerization system when the conversion of the monomer component reached 20%.

After the addition of the suspension stabilizer, the emulsion state of the polymerization system was broken with the progress of the polymerization to change to a suspension state, which was stable until completion of the polymerization.

The polymer resin thus produced was recovered from the reaction mixture by filtration, dehydrated and dried to give spherical particles of 0.35 mm in weight average particle size. The distribution of the particle size was narrow. Only little turbidity was recognized in the filtrate. No substantial deposit of the polymer onto the wall of the autoclave was seen.

EXAMPLE 2

Polymerization was carried out as in Example 1 except that the suspension stabilizer was added to the polymerization system when the conversion of the monomer component reached 8%.

After the addition of the suspension stabilizer, the emulsion state of the polymerization system was broken with the progress of the polymerization to change to a suspension state, which was stable until completion of the polymerization.

The polymer resin thus produced was recovered from the reaction mixture by filtration, dehydrated and dried to give spherical particles of 0.32 mm in weight average particle size. The distribution of the particle size was narrow. Only little turbidity was recognized in the filtrate. No substantial deposit of the polymer onto the wall of the autoclave was seen.

EXAMPLE 3

Polymerization was carried out as in Example 1 except that the suspension stabilizer was added to the polymerization system 10 minutes before the breaking of the emulsion state (i.e. when the conversion of the monomer component reached 55%).

Ten minutes after the addition of the suspension stabilizer, the emulsion state of the polymerization system was broken to change to a suspension state, which was stable until completion of the polymerization.

The polymer resin thus produced was recovered from the reaction mixture by filtration, dehydrated and dried to give spherical particles of 0.40 mm in weight average particle size. The distribution of the particle size was narrow. Only little turbidity was recognized in the filtrate. No substantial deposit of the polymer onto the wall of the autoclave was seen.

EXAMPLE 4

Polymerization was carried out as in Example 1 except that SBR latex (pH, 12.2; SBR content, 50%; SBR composition, 90% of polybutadiene and 10% of styrene) (200 g) was used in place of ABS latex.

After the addition of the suspension stabilizer, the emulsion state of the polymerization system was broken with the progress of the polymerization to change to a suspension state, which was stable until completion of the polymerization.

The polymer resin thus produced was recovered from the reaction mixture by filtration, dehydrated and dried to give spherical particles of 0.35 mm in weight average particle size. The distribution of the particle size was narrow.

EXAMPLE 5

Polymerization was carried out as in Example 1 except that SBR latex as employed in Example 4 (60 g) was used in addition to and together with ABS latex.

After the addition of the suspension stabilizer, the emulsion state of the polymerization system was broken with the progress of the polymerization to change to a suspension state, which was stable until completion of the polymerization.

The polymer resin thus produced was recovered from the reaction mixture by filtration, dehydrated and dried to give spherical particles of 0.40 mm in weight average particle size. The distribution of the particle size was narrow.

EXAMPLE 6

Into an autoclave as employed in Example 1, water (2500 ml) and SBR latex as employed in Example 4 (400 g) were charged, and stirring was started at 600 r.p.m. Then, styrene (1000 g) was added to the autoclave in 3 minutes, and a solution of t-butyl peroxybenzoate (5.0 g) as a polymerization initiator, t-dodecylmercaptan (1.0 g) as a chain transfer agent and tris-nonylphenyl phosphite (5.0 g) as an oxidation stabilizer in styrene (50 g) was added thereto. After replacement of the air in the autoclave by nitrogen gas, polymerization was initiated by elevation of the temperature to 115° C. and continued at this temperature for a total period of 4 hours, during which a solution of methyl cellulose ("Marpolose M-4000" manufactured by Matsomoto Yushi Seiyaku Co., Ltd.) (4.0 g) as a suspension stabilizer in water (100 ml) was added to the polymerization system when the conversion of the monomer component reached 25%.

After the addition of the suspension stabilizer, the emulsion state of the polymerization system was broken with the progress of the polymerization to change to a suspension state, which was stable until completion of the polymerization.

The polymer resin thus produced was recovered from the reaction mixture by filtration, dehydrated and dried to give spherical particles of 0.40 mm in weight average particle size. The distribution of the particle size was narrow. Only little turbidity was recognized in the filtrate. No substantial deposit of the polymer onto the wall of the autoclave was seen.

EXAMPLE 7

Into an autoclave as employed in Example 1, water (2500 ml) and SBR latex as employed in Example 4 (350 g) were charged, and stirring was started at 600 r.p.m. Then, styrene (300 g) and methyl methacrylate (700 g) were added to the autoclave in 5 minutes, and a solution of dilauroyl peroxide (8.0 g) as a polymerization initiator, t-dodecylmercaptan (3.0 g) as a chain transfer agent and tris-nonylphenyl phosphite (5.0 g) as an oxidation stabilizer in styrene (50 g) was added thereto. After replacement of the air in the autoclave by nitrogen gas, polymerization was initiated by elevation of the temperature to 70° C. and continued at this temperature for a total period of 5 hours, during which a suspension stabilizer as employed in Example 1 was added to the polymerization system when the conversion of the monomer reached 15%.

After the addition of the suspension stabilizer, the emulsion state of the polymerization system was broken with the progress of the polymerization to change to a suspension state, which was stable until completion of the polymerization.

The polymer resin thus produced was recovered from the reaction mixture by filtration, dehydrated and dried to give spherical particles of 0.35 mm in weight average particle size. The distribution of the particle size was narrow. Only little turbidity was recognized in the filtrate. No substantial deposit of the polymer onto the wall of the autoclave was seen.

COMPARATIVE EXAMPLE 1

Polymerization was carried out as in Example 1 except that the addition of the suspension stabilizer to the polymerization system was effected prior to the initiation of the polymerization. In the course of polymerization, the emulsion state of the polymerization system was broken to change to a suspension state.

The polymer resin thus produced was recovered from the reaction mixture by filtration, dehydrated and dried to give fine particles of 0.30 mm in weight average particle size. The distribution of the particle size was broad and inclined to the side of a finer particle size. Considerable turbidity was found in the filtrate. Much deposit of the polymer onto the wall of the autoclave was seen.

COMPARATIVE EXAMPLE 2

Polymerization was carried out as in Example 1 except that the addition of the suspension stabilizer to the polymerization system was effected at the breaking of the emulsion state.

The polymerization resin thus produced was recovered from the reaction mixture by filtration, dehydrated and dried to give coarse particles of 1.52 mm in weight average particle size and of irregular form. The distribution of the particle size was broad and inclined to a coarser particle size. Much deposit of the polymer onto the wall of the autoclave was seen.

COMPARATIVE EXAMPLE 3

Polymerization was carried out as in Example 1 except that the addition of the suspension stabilizer to the polymerization system was effected 30 minutes after the change of the emulsion state of the polymerization system to a suspension state (i.e. when the conversion of the monomer component reached 70%). The produced polymer particles were aggregated to make blocks, and the polymerization could not be completed.

COMPARATIVE EXAMPLE 4

Polymerization was carried out as in Example 6 except that the addition of the suspension stabilizer to the polymerization system was effected before the initiation of the polymerization or at the breaking of the emulsion state.

As the results, there were obtained fine particles of 0.31 mm in weight average particle size with a broad distribution in the former case and coarse particles of 1.50 mm in weight average particle size with a broad distribution in the latter case. In both cases, much attachment of the polymer onto the wall of the autoclave was seen. Further, in the former case, remarkable turbidity was found in the filtrate.

COMPARATIVE EXAMPLE 5

Polymerization was carried out as in Example 7 except that the addition of the suspension stabilizer to the polymerization system was effected before the initiation of the polymerization or at the breaking of the emulsion state.

As the results, there were obtained fine particles of 0.30 mm in weight average particle size with a broad distribution in the former case and coarse particles of 1.53 mm in weight average particle size with a broad distribution in the latter case. In both cases, much deposit of the polymer onto the wall of the autoclave was seen. Further, in the former case, remarkable turbidity was found in the filtrate.

What is claimed is:

1. A process for preparing polymer resins by polymerization of at least one ethylenic monomer onto at least one rubbery polymer optionally grafted with at least one ethylenic monomer which consists essentially of initiating the polymerization in an emulsion system free of a suspension, stabilizer adding a suspension stabilizer to the polymerization system at the stage after the conversion of the ethylenic monomer to be polymerized reaches 5% by weight and before the emulsion system is broken and then continuing the polymerization in a suspension system until completion of the polymerization.

2. The process according to claim 1, wherein the suspension stabilizer is a member selected from the group consisting of fine powders of inorganic compounds hardly soluble in water and natural or synthetic water-soluble high polymeric materials.

3. The process according to claim 2, wherein the suspension stabilizer is a member selected from the group consisting of magnesium carbonate, calcium tertiary phosphate, starch, gelatin, partially saponified polyvinyl alcohol, polyvinylpyrrolidone, methyl cellulose, hydroxyethyl cellulose and hydroxypropyl methyl cellulose.

4. The process according to claim 1, wherein the suspension stabilizer is used in an amount of 0.02 to 1.0 part by weight to 100 parts by weight of water in the polymerization system.

5. The process according to claim 1, wherein the rubbery polymer optionally grafted with at least one ethylenic monomer is a member selected from the group consisting of natural rubber, butadiene rubber, styrene-butadiene copolymer, acrylonitrile-butadiene copolymer, isoprene rubber, chloroprene rubber, acrylic rubber, ehtylene-propylene-diene terpolymer and ethylene-vinyl acetate copolymer and their graft copolymers with at least one of styrenic monomers, acrylonitrile and its related compounds, acrylic acid and its esters, methacrylic acid and its esters, vinyl esters, vinyl and vinylidene halides, vinylketone, acrylamide, vinylpyrrolidone, maleic anhydride and maleimide.

6. The process according to claim 1, wherein the ethylenic monomer to be polymerized onto the rubbery polymer optionally grafted with at least one ethylenic monomer is a member selected from the group consisting of styrenic monomers, acrylonitrile and its related compounds, acrylic acid and its esters, methacrylic acid and its esters, vinyl esters, vinyl and vinylidene halides, vinylketone, acrylamide, vinylpyrrolidone, maleic anhydride and maleimide.

7. The process according to claim 1, wherein the ethylenic monomer and the rubbery polymer optionally grafted with at least one ethylenic monomer is used in such a proportion as to make a rubber content of 3 to 60% by weight in the produced polymer resin.

8. The process according to claim 1, wherein the polymerization is carried out in the presence of a polymerization initiator.

9. The process according to claim 1, wherein the polymerization is carried out in the presence of a chain transfer agent.

10. The process according to claim 1, wherein the polymerization is carried out at a temperature from 50° to 140° C.